(12) United States Patent
Backer et al.

(10) Patent No.: US 8,476,375 B2
(45) Date of Patent: Jul. 2, 2013

(54) POLYMERS MODIFIED BY SILANES

(75) Inventors: Michael Backer, Barry (GB); Valerie Smits, Lobbes (BE); Damien Deheunynck, Braine l'Alleud (BE)

(73) Assignee: Dow Corning Corporation, Midland, MI (US)

( * ) Notice: Subject to any disclaimer, the term of this patent is extended or adjusted under 35 U.S.C. 154(b) by 173 days.

(21) Appl. No.: 13/001,677

(22) PCT Filed: Jul. 2, 2009

(86) PCT No.: PCT/EP2009/004799
§ 371 (c)(1),
(2), (4) Date: Mar. 24, 2011

(87) PCT Pub. No.: WO2010/000479
PCT Pub. Date: Jan. 7, 2010

(65) Prior Publication Data
US 2011/0178198 A1   Jul. 21, 2011

(30) Foreign Application Priority Data
Jul. 3, 2008   (GB) .................................. 0812185.7

(51) Int. Cl.
*C08F 230/08* (2006.01)
*C08F 4/34* (2006.01)
*C08J 3/28* (2006.01)
*C08J 9/04* (2006.01)
*C08L 51/06* (2006.01)

(52) U.S. Cl.
USPC ........... 525/342; 525/275; 525/288; 525/263; 522/114; 524/535; 556/446; 556/483

(58) Field of Classification Search
USPC ... 525/275, 288, 263, 342; 522/114; 524/535; 556/446, 483
See application file for complete search history.

(56) References Cited

U.S. PATENT DOCUMENTS

| | | | |
|---|---|---|---|
| 3,075,948 A * | 1/1963 | Santelli | 525/263 |
| 3,179,612 A | 4/1965 | Plueddemann | |
| 3,258,477 A | 6/1966 | Plueddemann et al. | |
| 3,414,551 A | 12/1968 | Reid et al. | |
| 3,458,460 A | 7/1969 | Shepard et al. | |
| 3,503,943 A | 3/1970 | Kresge et al. | |
| 3,646,155 A | 2/1972 | Scott | |
| 3,873,642 A | 3/1975 | Jezl | |
| 3,873,643 A | 3/1975 | Wu et al. | |
| 4,303,763 A | 12/1981 | Beasley | |
| 4,481,322 A | 11/1984 | Godlewski et al. | |
| 4,529,750 A * | 7/1985 | Gimpel | 523/210 |
| 4,702,868 A * | 10/1987 | Pontiff et al. | 264/50 |
| 4,709,084 A | 11/1987 | Pavlin et al. | |
| 4,730,031 A | 3/1988 | Sato et al. | |
| 4,755,262 A | 7/1988 | Matsunaga et al. | |
| 4,795,785 A | 1/1989 | Ito et al. | |
| 4,857,250 A | 8/1989 | Gale et al. | |
| 4,921,916 A | 5/1990 | Howell et al. | |
| 4,946,977 A | 8/1990 | Bernhardt et al. | |
| 4,990,383 A | 2/1991 | Bergstrom et al. | |
| 5,233,006 A | 8/1993 | Wolter et al. | |
| 5,373,059 A | 12/1994 | Asanuma et al. | |
| 5,382,633 A | 1/1995 | Scott et al. | |
| 5,532,398 A | 7/1996 | Wolter et al. | |
| 5,661,200 A | 8/1997 | Boudreaux, Jr. et al. | |
| 5,684,171 A | 11/1997 | Wideman et al. | |
| 5,852,099 A | 12/1998 | Vanel | |
| 5,929,127 A | 7/1999 | Raetzsch et al. | |
| 6,013,715 A | 1/2000 | Gornowicz et al. | |
| 6,028,146 A | 2/2000 | Kotlar et al. | |
| 6,153,691 A | 11/2000 | Gornowicz et al. | |
| 6,177,519 B1 | 1/2001 | Chung et al. | |
| 6,380,316 B1 | 4/2002 | Bahadur et al. | |
| 6,479,580 B1 | 11/2002 | Chorvath et al. | |
| 6,500,883 B1 | 12/2002 | Mack et al. | |
| 6,590,032 B2 | 7/2003 | Furukawa et al. | |
| 6,590,036 B2 | 7/2003 | Koike et al. | |

(Continued)

FOREIGN PATENT DOCUMENTS

| | | |
|---|---|---|
| BE | 652324 A | 2/1965 |
| CA | 1099840 A1 | 4/1981 |

(Continued)

OTHER PUBLICATIONS

English language abstract not available for CN 1747976; However, see English language equivalent US 20090264584. Orginal document extracted from the espacenet.com database on Aug. 3, 2012, 19 pages.

(Continued)

*Primary Examiner* — Mark Kaucher
(74) *Attorney, Agent, or Firm* — Howard & Howard Attorneys PLLC

(57) ABSTRACT

The invention relates to a process for grafting hydrolysable silane groups to a polyolefin, comprising reacting the polyolefin with an unsaturated silane, containing an olefinic —C=C— bond or acetylenic —C≡C— bond and having at least one hydrolysable group bonded to Si, or a hydrolysate thereof, in the presence of means capable of generating free radical sites in the polymer. The silane contains an aromatic ring or a further olefinic double bond or acetylenic unsaturation, the aromatic ring or the further olefinic double bond or acetylenic unsaturation being conjugated with the olefinic —C=C— or acetylenic —C≡C— unsaturation of the silane. The unsaturated silane may also contains electron-withdrawing moiety with respect to the olefinic —C=C— or acetylenic —C≡C— bond. The invention permits to provide a silane-modified polyolefin having a high grafting efficiency while limiting/preventing polymer degradation by chain scission. The silane-modified polyolefin can be further reacted with a polar surface, a filler or a polar polymer or reacted on itself to crosslink the polyolefin and obtain enhanced physical properties of the composites made thereof.

14 Claims, No Drawings

U.S. PATENT DOCUMENTS

| | | | |
|---|---|---|---|
| 6,590,039 | B1 | 7/2003 | Wang et al. |
| 6,632,888 | B2 | 10/2003 | Obrecht et al. |
| 6,774,255 | B1 | 8/2004 | Tardivat et al. |
| 6,841,694 | B2 | 1/2005 | Pfeiffer |
| 6,864,322 | B2 | 3/2005 | Gehlsen et al. |
| 6,864,323 | B2 | 3/2005 | Schlosser et al. |
| 6,984,747 | B2 | 1/2006 | Jacob et al. |
| 7,015,297 | B2 | 3/2006 | Schindler et al. |
| 7,041,744 | B2 | 5/2006 | Palmlof et al. |
| 7,074,876 | B2 | 7/2006 | Cruse et al. |
| 7,078,449 | B2 | 7/2006 | Pagano et al. |
| 7,238,740 | B2 | 7/2007 | Belin et al. |
| 7,241,824 | B2 | 7/2007 | Mangeret et al. |
| 8,008,524 | B2 | 8/2011 | Cruse et al. |
| 8,013,178 | B2 | 9/2011 | Klockmann et al. |
| 2002/0040101 | A1 | 4/2002 | Furukawa et al. |
| 2003/0114604 | A1* | 6/2003 | Schlosser et al. ............ 525/342 |
| 2003/0139621 | A1 | 7/2003 | Jacob et al. |
| 2003/0144403 | A1 | 7/2003 | Barruel et al. |
| 2005/0004386 | A1 | 1/2005 | Deschler et al. |
| 2005/0031813 | A1 | 2/2005 | Conrnette et al. |
| 2005/0119436 | A1 | 6/2005 | Ziche et al. |
| 2005/0131154 | A1 | 6/2005 | Cai et al. |
| 2005/0269737 | A1 | 12/2005 | Hogge et al. |
| 2005/0272867 | A1 | 12/2005 | Hogge et al. |
| 2005/0287300 | A1 | 12/2005 | Herrwerth et al. |
| 2006/0025506 | A1 | 2/2006 | Weller et al. |
| 2009/0143531 | A1 | 6/2009 | Ouhadi et al. |
| 2009/0186961 | A1 | 7/2009 | Araujo Da Silva et al. |
| 2009/0234066 | A1 | 9/2009 | Araujo Da Silva et al. |
| 2009/0264584 | A1 | 10/2009 | Walia et al. |
| 2010/0016500 | A1 | 1/2010 | Sone et al. |
| 2010/0040927 | A1 | 2/2010 | Yoshida et al. |
| 2010/0168343 | A1 | 7/2010 | Harris et al. |
| 2011/0152458 | A1 | 6/2011 | Araujo Da Silva et al. |
| 2011/0172367 | A1 | 7/2011 | Backer et al. |
| 2011/0178198 | A1 | 7/2011 | Backer et al. |
| 2011/0190411 | A1 | 8/2011 | Backer et al. |
| 2011/0287205 | A1 | 11/2011 | Klockmann et al. |
| 2012/0059121 | A1 | 3/2012 | Backer et al. |
| 2012/0065319 | A1 | 3/2012 | Backer et al. |
| 2012/0283346 | A1 | 11/2012 | Backer et al. |
| 2012/0283362 | A1* | 11/2012 | Backer et al. .................. 524/13 |
| 2012/0283388 | A1* | 11/2012 | Backer et al. ................ 525/106 |
| 2012/0289620 | A1 | 11/2012 | Deheunynck et al. |

FOREIGN PATENT DOCUMENTS

| | | |
|---|---|---|
| CN | 1747976 A | 3/2006 |
| DE | 10223073 C1 | 10/2003 |
| DE | 102006059295 A1 | 6/2008 |
| EP | 0225186 A2 | 6/1987 |
| EP | 0245938 A2 | 11/1987 |
| EP | 0276790 A2 | 8/1988 |
| EP | 0372561 A2 | 6/1990 |
| EP | 0581150 A2 | 2/1994 |
| EP | 0735088 A1 | 10/1996 |
| EP | 0776945 A2 | 6/1997 |
| EP | 0900801 A1 | 3/1999 |
| EP | 0943635 A1 | 9/1999 |
| EP | 0451709 B1 | 12/1999 |
| EP | 1018533 A2 | 7/2000 |
| EP | 1022302 A2 | 7/2000 |
| EP | 1050548 A1 | 11/2000 |
| EP | 0450624 B1 | 9/2001 |
| EP | 1134251 A1 | 9/2001 |
| EP | 1270581 A2 | 1/2003 |
| EP | 1318153 A1 | 6/2003 |
| EP | 1323779 A1 | 7/2003 |
| EP | 1354912 A1 | 10/2003 |
| EP | 1375569 A1 | 1/2004 |
| EP | 0809672 B1 | 6/2004 |
| EP | 1619214 A1 | 1/2006 |
| EP | 1683801 A2 | 7/2006 |
| EP | 1721930 A1 | 11/2006 |
| EP | 1818186 A1 | 8/2007 |
| EP | 1942131 A1 | 7/2008 |
| EP | 0958298 B2 | 10/2008 |
| EP | 2039705 A1 | 3/2009 |
| EP | 2085419 A1 | 8/2009 |
| GB | 957917 A | 5/1964 |
| GB | 1020740 | 2/1966 |
| GB | 1407827 | 9/1975 |
| GB | 2134530 A | 8/1984 |
| GB | 2192891 A | 1/1988 |
| GB | 2202537 A | 2/1988 |
| JP | 59-147035 A | 8/1984 |
| JP | 3143979 A | 6/1991 |
| JP | 05-070529 A | 3/1993 |
| JP | 06172459 | 6/1994 |
| JP | 2007-308653 A | 11/2007 |
| JP | 2007329069 | 12/2007 |
| JP | 2008097868 A | 4/2008 |
| JP | 2008-106118 A | 5/2008 |
| JP | 2008-184545 | 8/2008 |
| WO | WO 8705916 A2 | 10/1987 |
| WO | WO 00/52073 A1 | 9/2000 |
| WO | WO 0052071 A1 | 9/2000 |
| WO | WO 0052072 A1 | 9/2000 |
| WO | WO 00/63293 A1 | 10/2000 |
| WO | WO 01/49781 A1 | 7/2001 |
| WO | WO 01/49782 A1 | 7/2001 |
| WO | WO 01/49783 A1 | 7/2001 |
| WO | WO 02/22728 A1 | 3/2002 |
| WO | WO 03/091314 A1 | 11/2003 |
| WO | WO 2004072135 A1 | 8/2004 |
| WO | WO 2004/078813 A2 | 9/2004 |
| WO | WO 2005/001037 A2 | 1/2005 |
| WO | WO 2005/007066 A2 | 1/2005 |
| WO | WO 2005103061 A1 | 11/2005 |
| WO | WO 2006/019468 | 2/2006 |
| WO | WO 2006015010 A2 | 2/2006 |
| WO | WO 2006/125532 A1 | 11/2006 |
| WO | WO 2006/125533 A1 | 11/2006 |
| WO | WO 2006/125534 A1 | 11/2006 |
| WO | WO 2007008765 A2 | 1/2007 |
| WO | WO 2007/014687 A1 | 2/2007 |
| WO | WO 2007/061550 A1 | 5/2007 |
| WO | WO 2007147687 A1 | 12/2007 |
| WO | WO 2008/042418 A1 | 4/2008 |
| WO | WO 2009/073274 A1 | 6/2009 |
| WO | WO 2010/003007 A2 | 1/2010 |
| WO | WO 2010/005525 A1 | 1/2010 |
| WO | WO 2010000477 A1 | 1/2010 |
| WO | WO 2010000478 A1 | 1/2010 |
| WO | WO 2010/125123 A1 | 11/2010 |
| WO | WO 2010/125124 A1 | 11/2010 |
| WO | WO 2011/083043 A1 | 7/2011 |
| WO | WO 2011/083044 A1 | 7/2011 |
| WO | WO 2011/083045 A1 | 7/2011 |
| WO | WO 2011/083046 A1 | 7/2011 |

OTHER PUBLICATIONS

Lin, Yao and Huang in Polymer 41,4537-4542 (2000) entitled 'Influences of grafting formulations and processing conditions on properties of silane grafted moisture crosslinked polypropylenes'.

Huang, Lu and Liu in J. Applied Polymer Science 78, 1233-1238 (2000) entitled 'Influences on grafting formulations and extrusion conditions on properties of silane grafted polypropylenes'.

Yang, Song, Zhao, Yang and She in Polymer Engineering and Science, 1004-1008 (2007) entitled 'Mechanism of a one-step method for preparing silane grafting and crosslinking polypropylene'.

No English language abstract for BE 652324. However, see English language equivalent GB 1020740 extracted from the espacenet.com database on Jul. 13, 2011, 18 pages.

English language abstract and equivalent for EP 0245938 extracted from the espacenet.com database on Jul. 13, 2011, 28 pages.

English language abstract and equivalent for EP 1318153 extracted from the espacenet.com database on Jul. 13, 2011, 15 pages.

English language abstract and translation for JP 06172459 extracted from the PAJ database on Jul. 13, 2011, 25 pages.

English language abstract and translation for JP 2007329069 extracted from the PAJ database on Jul. 13, 2011, 26 pages.

English language abstract and equivalent for JP 2008097868 extracted from the espacenet.com database on Jul. 13, 2011, 33 pages.

International Search Report for Application No. PCT/EP2009/004797 dated Sep. 4, 2009, 11 pages.
International Search Report for Application No. PCT/EP2009/004798 dated Sep. 1, 2009, 6 pages.
International Search Report for Application No. PCT/EP2009/004799 dated Sep. 9, 2009, 9 pages.
English language abstract for JP 59-147035 extracted from the PAJ database on Oct. 31, 2012, 9 pages.
English language abstract and translation for JP 2007-308653 extracted from the PAJ database on Oct. 31, 2012, 71 pages.
International Search Report for Application No. PCT/EP2010/070481 dated Feb. 4, 2011, 3 pages.
English language abstract for DE 10223073 extracted from the espacenet.com database on Apr. 9, 2012, 10 pages.
English language abstract for EP 0450624 extracted from the espacenet.com database on Apr. 9, 2012, 36 pages.
English language abstract for EP 0451709 extracted from the espacenet.com database on Apr. 9, 2012, 24 pages.
English language abstract for EP 0735088 extracted from the espacenet.com database on Apr. 9, 2012, 13 pages.
English language abstract for EP 1683801 extracted from the espacenet.com database on Apr. 9, 2012, 49 pages.
English language abstract for JP 2008-106118 extracted from the PAJ database on Apr. 9, 2012, 27 pages.
English language abstract and translation for JP 2008-184545 extracted from the PAJ database on Apr. 9, 2012, 34 pages.
English language abstract for WO 01/49781 extracted from the espacenet.com database on Apr. 9, 2012, 49 pages.
English language abstract for WO 01/49782 extracted from the espacenet.com database on Apr. 9, 2012, 44 pages.
English language abstract for WO 01/49783 extracted from the espacenet.com database on Apr. 9, 2012, 36 pages.
English language abstract for WO 02/22728 extracted from the espacenet.com database on Apr. 9, 2012, 41 pages.
English language abstract for WO 2006/125532 extracted from the espacenet.com database on Apr. 9, 2012, 40 pages.
English language abstract for WO 2006/125533 extracted from the espacenet.com database on Apr. 9, 2012, 53 pages.
English language abstract for WO 2006/125534 extracted from the espacenet.com database on Apr. 9, 2012, 53 pages.
International Search Report for Application No. PCT/EP2010/055754 dated Oct. 15, 2010, 3 pages.
International Search Report for Application No. PCT/EP2010/055757 dated Jun. 7, 2010, 4 pages.
English language abstract and translation extracted for JP 05-070529 from the PAJ database on Oct. 31, 2012, 76 pages.
English language abstract for EP 0735088 extracted from the espacenet.com database on Nov. 5, 2012, 13 pages.
English language abstract and machine-assisted English translation for DE 102006059295 extracted from the espacenet.com database on Nov. 5, 2012, 39 pages.
English language abstract for JP 3143979 extracted from the espacenet.com database on Nov. 5, 2012, 12 pages.
March's Advanced Organic Chemistry, 5th Edition, John Wiley & Sons, NY 2001, at chapter 15-58, pp. 1062-1063.
B.C. Ranu et al., "Significant rate acceleration of the aza-Michael reaction in water", Tetrahedron Letters 48 (2007), pp. 141-143.
International Search Report for Application No. PCT/EP2010/070480 dated Mar. 4, 2011, 4 pages.
International Search Report for Application No. PCT/EP2010/070482 dated Feb. 2, 2011, 4 pages.
The Vanderbilt Rubber Handbook (1978), pp. 344-346.
Do Hung Han et al., "Crosslinking and degradation of polypropylene by electron beam irradiation in the presence of trifunctional monomers", Radiation Physics and Chemistry 69 (2004) 239-244.
Coiai S. et al., "Control of Degradation Reactions during Radical Functionalization of Polypropylene in the Melt", vol. 37, No. 22, Nov. 2, 2004, pp. 8414-8423.
Deng Changfu et al., "Grafting of Maleic Anhydride onto Hyperbranched Polyethylene and Suppression of Chain Degradation and Crosslinking Side Reactions", No. 5, 2008, pp. 435-441.
Liu et al., "Reactive Adsorption of Aminosilane onto the Glycidyl Methacrylate Graft-Copolymerized Poly (tetrafluoroethylene) Film Surface for Adhesion Enhancement with Evaporated Copper", Journal of Polymer Science: Part A Polymer Chemistry, vol. 38, No. 1, Jan. 2000, pp. 80-89.

* cited by examiner

POLYMERS MODIFIED BY SILANES

RELATED APPLICATIONS

This application claims priority to and all the advantages of International Patent Application No. PCT/EP2009/004799, filed on Jul. 2, 2009, which claims priority to Great Britain Patent Application No. GB 0812185.7, filed on Jul. 3, 2008.

This invention relates to a process of grafting hydrolysable and crosslinkable groups onto polymers and to the graft polymers produced, and to a process of crosslinking the grafted polymers. In particular it relates to a process of grafting hydrolysable silane groups onto polyolefins.

Polyolefins possess low polarity which is an important benefit for many applications. However, in some instances, the non-polar nature of polyolefins might be a disadvantage and limit their use in a variety of end-uses. For example due to their chemically inertness, functionalisation and crosslinking of polyolefins are difficult. The modification of polyolefins resins by grafting specific compound onto polymer backbone to improve properties is known. BE-A-652324 and U.S. Pat. No. 3,414,551 describes a process for reacting maleic anhydride with polypropylene. U.S. Pat. No. 3,873,643 describes the grafting of cyclic ethylenically unsaturated carboxylic acids and anhydrides onto polyethylene, under melt conditions and in presence of a peroxide. Those types of monomer are providing polarity to polymer chain but will not gives access to crosslinking.

The technology described in these patents is efficient to functionalize and crosslink polyethylenes. However when trying to functionalize polypropylene using the above technologies, the grafting is accompanied by degradation of the polymer by chain scission in the β-position, or so-called β-scission. Such degradation results in a decrease of the viscosity of the material to be processed. Furthermore, this degradation results in a polymer having inferior performance compared to the starting material.

JP-A-1994-172459 describes producing a modified polyolefin with a vinyl monomer using peroxide in the presence of a co-agent such as an aromatic compound which prevents the breakage of the polymer chain. Vinylsilanes are described for use with polyethylene. However maleic anhydride was described as being the preferred vinyl monomer for use with polypropylene. EP-A-225186 also describes styrene used in combination with a non-silane monomer to prevent the polymer degradation. U.S. Pat. No. 6,028,146 describes grafting monomers onto polypropylene by mixing upon heating the polypropylene with an unsaturated epoxy compound, styrene and peroxide.

An article by Liu, Yao and Huang in Polymer 41, 4537-4542 (2000) entitled 'Influences of grafting formulations and processing conditions on properties of silane grafted moisture crosslinked polypropylenes' describes the grafting of polypropylene with unsaturated silanes and the degree of crosslinking (gel percentage) achieved and extent of polypropylene degradation. The unsaturated silanes described are methacryloxypropyltrimethoxysilane and vinyltriethoxysilane. An article by Huang, Lu and Liu in J. Applied Polymer Science 78, 1233-1238 (2000) entitled 'Influences of grafting formulations and extrusion conditions on properties of silane grafted polypropylenes' describes a similar grafting process using a twin screw extruder. An article by Lu and Liu in China Plastics Industry, Vol. 27, No. 3, 27-29 (1999) entitled 'Hydrolytic crosslinking of silane graft onto polypropylene' is similar. An article by Yang, Song, Zhao, Yang and She in Polymer Engineering and Science, 1004-1008 (2007) entitled 'Mechanism of a one-step method for preparing silane grafting and crosslinking polypropylene' describes silane grafting and crosslinking in a one-step method in a twin screw reactive extruder. The use of a co-agent such as styrene in combination with silane inhibits polymer degradation but there is still a need for improved grafting efficiency of the silane.

U.S. Pat. No. 3,646,155 describes crosslinking of polyolefins, particularly polyethylene, by reaction (grafting) of the polyolefin with an unsaturated hydrolysable silane at a temperature above 140° C. and in the presence of a compound capable of generating free radical sites in the polyolefin. Subsequent exposure of the reaction product to moisture and a silanol condensation catalyst effects crosslinking. This process has been extensively used commercially. EP-B-809672, EP-A-1323779, JP2008097868, JP2007329069, US2005/0272867, US2005/0269737, U.S. Pat. Nos. 3,075,948 and 7,041,744 are further examples of patents describing similar grafting and crosslinking process where the unsaturated hydrolysable silane used is generally vinyltrimethoxysilane. U.S. Pat. No. 6,864,323 teaches to improve scorching performance by adding a small amount of a further compound, called compound (iii) which may be a conjugated hydrocarbon and/or at least one organofunctional silane of the general formula R-Xn-C(R)=C(R)—C(R)=C(R)-Xn-Si(R1)m(OR2)(3-m). The groups R are identical or different and R is a hydrogen atom or an alkyl group having from 1 to 3 carbon atoms or an aryl group or an aralkyl group, preferably a methyl group or a phenyl group, R(1) is a linear or branched alkyl group having from 1 to 4 carbon atoms, R(2) is a linear, branched, or cyclic alkyl group having from 1 to 8 carbon atoms, preferably a methyl, ethyl, n-propyl, or isopropyl group, the groups X are identical or different, and X is a group selected from the series —CH2-, —(CH2)2-, —(CH2)3-, —O(O)C(CH2)3- and —C(O)O—(CH2)3-, and n is 0 or 1, and m is 0, 1, 2 or 3.

The object of the present invention is to provide a silane-modified polyolefin having a high grafting efficiency while limiting/preventing polymer degradation by chain scission. The silane-modified polyolefin can be further reacted with polar groups present on the surface of fillers or attached to another polymer, or reacted on itself to crosslink the silane-modified polyolefin and form composite materials with improved properties, as this will be shown trough examples in the present application. Alternatively, the silane can be first used to treat a filler and the treated filler is then used for grafting to the polymer.

A process according to this invention for grafting hydrolysable silane groups to a polyolefin, comprising reacting the polyolefin with an unsaturated silane, containing an olefinic —CH=CH— bond or acetylenic —C≡C— bond and having at least one hydrolysable group bonded to Si, or an hydrolysate thereof, in the presence of means for generating free radical sites in the polyolefin, is characterized in that the silane contains an aromatic ring or a further olefinic double bond or acetylenic unsaturation, the aromatic ring or the further olefinic or acetylenic bond being conjugated with the olefinic —CH=CH— or acetylenic —C≡C— unsaturation of the silane.

The means for generating free radical sites in the polyolefin generally comprises a compound capable of generating free radicals, and thus capable of generating free radical sites in the polyolefin. Other means include applying shear or electron beam.

By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety.

According to the invention, hydrolysable silane groups are grafted to a polyolefin by reacting the polyolefin with a specific silane having together:
1. at least one hydrolysable group bonded to Si,
2. an olefinic or acetylenic bond and
3. an aromatic ring or a further unsaturation which is conjugated with the olefinic or acetylenic bond.

We have found according to the invention that the use of an hydrolysable unsaturated silane containing an aromatic ring or a further olefinic bond conjugated with the olefinic —C=C— or acetylenic —C≡C— unsaturation of the silane in carrying out the grafting reaction on the polyolefin gives enhanced grafting yield and/or less degradation of the polymer compared to grafting with an unsaturated silane not containing an aromatic ring or a further olefinic bond. The use of a co-agent such as styrene or an unsaturated non hydrolysable silane (i.e. an unsaturated silane which has no hydrolysable group bonded to Si), in combination with an unsaturated hydrolysable silane has some limitation as a competitive reaction takes place between grafting with co-agent and grafting with the hydrolysable unsaturated silane. The non hydrolysable silane or styrene co-agent will not provide useful functionalisation or crosslinkable groups. The process of the present invention provides a high grafting efficiency while preventing chain scission with a single molecule. There is no competitive reaction between the monomer which grafts silane groups onto the polyolefin and the monomer which inhibits degradation, and hence the invention provides a more efficient reaction. The use of an unsaturated silane containing a further olefinic double bond or acetylenic unsaturation conjugated with the olefinic —CH=CH— or acetylenic —C≡C— unsaturation of the silane in carrying out the grafting reaction gives similar advantages to those obtained with an unsaturated silane containing an aromatic ring. Aromatic containing substances may have disadvantages in terms of eco-toxicity.

The invention includes a polyolefin grafted with hydrolysable silane groups produced by the above process. The silane-modified polyolefin can be further reacted with a polar surface, filler, polar polymer or reacted on itself to crosslink the polymer.

The invention thus also includes a process for crosslinking a polyolefin, characterized in that a grafted polyolefin produced as described above is exposed to moisture in the presence or absence of a silanol condensation catalyst.

The polyolefin starting material can for example be a polymer of an olefin having 2 to 18 carbon atoms, particularly an alpha olefin of the formula CH2=CHQ where Q is a hydrogen or a linear or branched alkyl group having 1 to 8 carbon atoms. The polyolefin can be polyethylene or an ethylene copolymer, but polyethylene and polymers consisting mainly of ethylene units do not usually degrade when free radical sites are generated in the polyethylene. Many polymers of olefins having 3 or more carbon atoms, for example polypropylene, undergo polymer degradation by chain β-scission when free radical sites are generated in the polyolefin. The process of the invention is particularly useful for such polyolefins, since it achieves grafting while inhibiting degradation of the polyolefin.

The polyolefin can for example be a polymer of ethene (ethylene), propene (propylene), butene or 2-methyl-propene-1 (isobutylene), hexene, heptene, octene, styrene. Propylene and ethylene polymers are an important class of polymers, particularly polypropylene and polyethylene. Polypropylene is a commodity polymer which is broadly available and of low cost. It has low density and is easily processed and versatile. Most commercially available polypropylene is isotactic polypropylene, but the process of the invention is applicable to atactic and syndiotactic polypropylene as well as to isotactic polypropylene. Isotactic polypropylene is prepared for example by polymerization of propene using a Ziegler-Natta catalyst or a chromium catalyst or a metallocene catalyst. The invention can provide a crosslinked polypropylene of improved properties from commodity polypropylene. The polyethylene can for example be high density polyethylene of density 0.955 to 0.97 g/cm3, medium density polyethylene (MDPE) of density 0.935 to 0.955 g/cm3 or low density polyethylene (LDPE) of density 0.918 to 0.935 g/cm3 including ultra low density polyethylene, high pressure low density polyethylene and low pressure low density polyethylene, or microporous polyethylene. The polyethylene can for example be produced using a Ziegler-Natta catalyst, a chromium catalyst or a metallocene catalyst. The polyolefin can alternatively be a polymer of a diene, such as a diene having 4 to 18 carbon atoms and at least one terminal double bond, for example butadiene or isoprene. The polyolefin can be a copolymer or terpolymer, for example a copolymer of propylene with ethylene or a copolymer of propylene or ethylene with an alpha-olefin having 4 to 18 carbon atoms, or of ethylene or propylene with an acrylic monomer such as acrylic acid, methacrylic acid, acrylonitrile, methacrylonitrile or an ester of acrylic or methacrylic acid and an alkyl or substituted alkyl group having 1 to 16 carbon atoms, for example ethyl acrylate, methyl acrylate or butyl acrylate, or a copolymer with vinyl acetate. The polyolefin can be a terpolymer for example a propylene ethylene diene terpolymer. Alternatively, the polyolefin can be a diene polymer such as polybutadiene, polyisoprene or a copolymer of butadiene with styrene, or a terpolymer of butadiene with ethylene and styrene or with acrylonitrile and styrene. The polyolefin can be heterophasic, for example a propylene ethylene block copolymer.

A mixture of different polyolefins can be used. The unsaturated silane and the compound capable of generating free radical sites in the polyolefin can be mixed with one type of polyolefin to form a masterbatch which can subsequently be mixed with a different type of polyolefin. For example microporous polypropylene is very effective in mixing with liquid additives to form a masterbatch, which can be mixed with bulk polymer. Microporous polyethylene or ethylene vinyl acetate copolymer are also very effective in mixing with liquid additives to form a masterbatch, and such a masterbatch can be mixed with an polymer such as polypropylene.

The hydrolysable group of the silane preferably has the formula —SiRaR'(3-a) wherein R represents a hydrolysable group; R' represents a hydrocarbyl group having 1 to 6 carbon atoms; and a has a value in the range 1 to 3 inclusive. Each hydrolysable group R in the —SiRaR'(3-a) group is preferably an alkoxy group, although alternative hydrolysable groups such as acyloxy, for example acetoxy, ketoxime, for example methylethylketoxime, alkyllactato, for example ethyllactato, amino, amido, aminoxy or alkenyloxy groups can be used. Alkoxy groups R generally each have a linear or branched alkyl chain of 1 to 6 carbon atoms and most preferably are methoxy or ethoxy groups. The value of a can for example be 3, for example the silane can be a trimethoxy silane, to give the maximum number of crosslinking sites. However each alkoxy group generates a volatile organic alcohol when it is hydrolysed, and it may be preferred that the value of a is 2 or even 1 to minimize the volatile organic material emitted during crosslinking. The group R' if present is preferably a methyl or ethyl group.

The unsaturated silane can be partially hydrolysed and condensed into oligomers containing siloxane linkages, provided that such oligomers still contain at least one hydrolysable group bonded to Si per unsaturated silane monomer unit, so that the graft polymer has sufficient reactivity towards itself and towards polar surfaces and materials. If the grafted polymer is to be crosslinked, it is usually preferred that hydrolysis of the silane before grafting should be minimized.

Preferably, the unsaturated silane contains an electron-withdrawing moiety with respect to the olefinic —C═C— or acetylenic —C≡C— bond. An electron-withdrawing moiety is a chemical group which draws electrons away from a reaction center. The electron-withdrawing moiety can in general be any of the groups listed as dienophiles in Michael B. Smith and Jerry March; March's Advanced Organic Chemistry, 5$^{th}$ edition, John Wiley & Sons, New York 2001, at Chapter 15-58 (page 1062) provided that the groups are capable of being substituted by a —SiR$_a$R'$_{(3-a)}$ group. The moiety can be especially a C(═O)R*, C(═O)OR*, OC(═O)R*, C(═O)Ar moiety in which Ar represents arylene substituted by a —SiR$_a$R'$_{(3-a)}$ group and R* represents a hydrocarbon moiety substituted by a —SiR$_a$R'$_{(3-a)}$ group. Z can also be a C(═O)—NH—R* moiety. Preferred silanes include those of the form R"—CH═CH—X—Y—SiR$_a$R'$_{(3-a)}$ (III) or R"—C≡C—X—Y—SiR$_a$R'$_{(3-a)}$ (IV) in which X represents a chemical linkage having an electron withdrawing effect with respect to the —CH═CH— or a —C≡C— bond such as a carboxyl, carbonyl, or amide linkage, and Y represents a divalent organic spacer linkage comprising at least one carbon atom separating the linkage X from the Si atom. Electron-donating groups, for example alcohol group or amino group may decrease the electron withdrawing effect. In one embodiment, the unsaturated silane is free of such group. Steric effects for example steric hindrance of a terminal alkyl group such as methyl, may affect the reactivity of the olefinic or acetylenic bond. In one embodiment, the unsaturated silane is free of such sterically hindering group. Groups enhancing the stability of the radical formed during the grafting reaction, for example double bond or aromatic group conjugated with the unsaturation of the silane, are present in the unsaturated silane. The latter groups have an activation effect with respect to the —CH═CH— or —C≡C— bond.

The unsaturated silane can for example have the formula CH2═CH—C6H4-A-SiRaR'(3-a) (I) or CH≡C—C6H4-A-SiRaR'(3-a) (II), wherein A represents a direct bond or a spacer group.

If A represents a direct bond in CH2═CH—C6H4-A-SiRaR'(3-a) (I), the silane is trimethoxysilylstyrene, for example 4-(trimethoxysilyl)styrene. 4-(trimethoxysilyl)styrene can be prepared via the so-called Grignard reaction of 4-bromo- and/or 4-chlorostyrene with tetramethoxysilane in the presence of Magnesium as described in EP-B-1318153 or with tetrachlorosilane and subsequent alkoxylation.

If A represents a spacer group, it can be an organic group such as, for example, a divalent organic group comprising at least one carbon atom, for example an alkylene group such as methylene, ethylene or propylene, or an arylene group, or a polyether chain, e.g., polyethylene glycol or polypropylene glycol. A can be for example a linear or branched alkylene group having 1 to 4 carbon atoms, for example the silane can be 2-styryl-ethyltrimethoxysilane or 3-styryl-propyltrimethoxysilane. Styrylethyltrimethoxysilane is e.g. commercially available from Gelest, Inc as a mixture of meta and para, as well as alpha, and beta isomers.

Alternatively, the spacer group A can comprise a heteroatom linking group particularly an oxygen, sulfur or nitrogen heteroatom. Preferably the heteroatom linking group is selected from the group consisting of —O—, —S—, —NH—, with mercapto (—S—) group being preferred. Examples of unsaturated silanes of this type and their synthesis, for example from vinylbenzylchloride with silylthiolate or aminosilane, are described in WO2006/015010. A preferred silane is vinylphenylmethylthiopropyltrimethoxysilane.

We have found according to the invention that the use of an unsaturated silane of the formula CH2═CH—C6H4-A-SiRaR'(3-a) (I) or CH≡C—C6H4-A-SiRaR'(3-a) (II) in carrying out the grafting reaction on the polyolefin may provide an efficient grafting while preventing polymer degradation compared to grafting with an olefinically unsaturated silane such as vinyltrimethoxysilane not containing vinyl aromatic group. A more efficient grafting is also observed in comparison to vinyltrimethoxysilane+co-agent such as styrene. The enhanced grafting can lead to enhanced crosslinking of the polyolefin in a shorter time in the presence of moisture and possibly a silanol condensation catalyst.

The grafted polyolefin can for example contain moieties of the formula PP—CH(CH3)-C6H4-A-SiRaR'(3-a) and/or grafted moieties of the formula PP—CH2-CH2-C6H4-A-SiRaR'(3-a) wherein A represents a direct bond or a divalent organic group having 1 to 12 carbon atoms; R represents a hydrolysable group; R' represents a hydrocarbyl group having 1 to 6 carbon atoms; a has a value in the range 1 to 3 inclusive; and PP represents a polyolefin chain.

The unsaturated silane can alternatively be of the formula R"—CH═CH-A-SiRaR'(3-a) (III), R"—C≡C-A-SiRaR'(3-a) (IV) or R"—C(═CH2)-A-SiRaR'(3-a) (V), where R" represents a moeity containing an aromatic ring or a C═C bond conjugated with the C═C or C≡C and A represents a direct bond or a divalent organic linkage having 1 to 12 carbon atoms.

When R" is an aromatic ring, the unsaturated silane can for example be cis/trans beta(trimethoxysilyl)styrene or alpha (trimethoxysilyl)styrene.

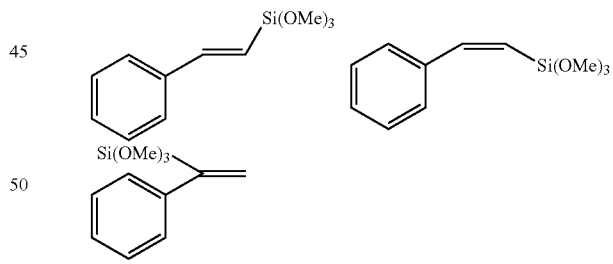

The styrene molecules substituted at the olefinic carbon atoms can be prepared via hydrosilylation reaction of phenylacetylene under organo-metal or metal catalysis as described e.g. in PL-B-188756 or in M. Chauhan, P. Boudjouk et al., J. Organomet. Chem. 645 (1-2), 2002, 1-13. Alternative routes as cross-coupling reaction between vinylalkoxysilanes and aryl bromides or chlorides are described e.g. in E. Alacid et al., Advanced Synthesis & Catalysis 348(15), 2006, 2085-2091.

In some embodiments, R" contains, in addition to the aromatic ring or a C═C bond conjugated with the C═C or C≡C bond, a moiety having an electron withdrawing effect with respect to the —CH═CH— or —C≡C— bond.

In one type of preferred unsaturated silane, A represents an organic linkage A' having an electron withdrawing effect with respect to the —CH═CH— or —C≡C— bond. The electron withdrawing linkage may give enhanced grafting on the polyolefin compared to an olefinically unsaturated silane such as vinyltrimethoxysilane not containing an electron withdrawing moiety. An electron-withdrawing linkage is derived from a electron-withdrawing moiety. Preferred electron-withdrawing linkage are C(═O)O, OC(═O), C(═O) C(═O)—NH—.

The unsaturated silane can alternatively be of the formula R'"—CH═CH-A-SiRaR'(3-a), R"—C≡C-A-SiRaR'(3-a) (IV) or R'"—C(═CH2)-A-SiRaR'(3-a) (V), where R'" represents a moeity containing an aromatic ring or a C═C bond conjugated with the C═C or C≡C and A represents a direct bond or a divalent organic linkage having 1 to 12 carbon atoms.

A polyolefin grafted with hydrolysable silane groups can thus contain grafted moieties of the formula R'"—CH(PP)—CH2-A'-SiRaR'(3-a) and/or grafted moieties of the formula R'"—CH2-CH(PP)-A'-SiRaR'(3-a) wherein R represents a hydrolysable group; R' represents a hydrocarbyl group having 1 to 6 carbon atoms; a has a value in the range 1 to 3 inclusive; A' represents a chemical linkage having an electron withdrawing effect; R" represents a group comprising an aromatic ring or a C═C bond; and PP represents a polyolefin chain.

In the unsaturated silane of the formula R"—CH═CH—X—Y—SiRaR'(3-a) (VI) or R"—C≡C—X—Y—SiRaR'(3-a) (VII), the electron withdrawing linkage X is preferably a carboxyl linkage. Preferred silanes thus have the formula R"—CH═CH—C(═O)O—Y—SiRaR'(3-a) (VIII). When the group R" represents phenyl, the moiety R"—CH═CH—C(═O)O—Y— in the unsaturated silane (VIII) is a cinnamyloxyalkyl group. The unsaturated silane can for example be 3-cinnamyloxypropyltrimethoxysilane,

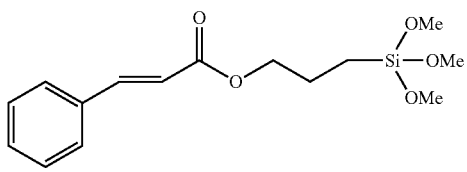 [SMILES: CO[Si](CCCOC(=O)/C=C/c1ccccc1)(OC)OC]

whose preparation is described in U.S. Pat. No. 3,179,612. Preferably the group R" can be a furyl group, for example a 2-furyl group, with the silane being an alkoxysilylalkyl ester of 3-(2-furyl)acrylic acid, i.e.,

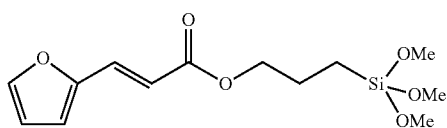 [SMILES: CO[Si](CCCOC(=O)/C=C/c1ccco1)(OC)OC]

Alternative preferred unsaturated silanes have the formula R2-CH═CH—CH═CH-A'-SiRaR'(3-a), where R2 represents hydrogen or a hydrocarbyl group having 1 to 12 carbon atoms and A' represents an organic linkage having an electron withdrawing effect with respect to the adjacent —CH═CH— bond. The linkage A' can for example be a carbonyloxyalkyl linkage. The unsaturated silane can be a sorbyloxyalkylsilane such as 3-sorbyloxypropyltrimethoxysilane CH3-CH═CH—CH═CH—C(═O)O—(CH2)3-Si(OCH3)3, i.e.,

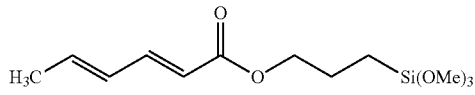

Other preferred unsaturated silanes have the formula A"-CH═CH—CH═CH-A-SiRaR'(3-a), where A" represents an organic moiety having an electron withdrawing effect with respect to the adjacent —CH═CH— bond and A represent a direct bond or a divalent organic linkage having 1 to 12 carbon atoms.

In general all unsaturated silanes which are silylalkyl esters of an unsaturated acid can be prepared from the unsaturated acid, for example acrylic, maleic, fumaric, sorbic or cinnamic acid, propynoic acid or butyne-dioic acid, by reaction of the corresponding carboxylate salt with the corresponding chloroalkylalkoxysilane. In a first step, the alkali salt of the carboxylic acid is formed either by reaction of the carboxylic acid with alkali alkoxide in alcohol, as described e.g. in U.S. Pat. No. 4,946,977, or by reaction of the carboxylic acid with aqueous base and subsequent removal of the water via azeotropic distillation, as described e.g. in WO-2005/103061. A trialkyl ammonium salt of the carboxylic acid can be formed by direct reaction of the free carboxylic acid with trialkyl amine, preferentially tributyl amine or triethyl amine as described in U.S. Pat. Nos. 3,258,477 or 3,179,612. In a second step the carboxylic acid salt is then reacted via nucleophilic substitution reaction with the chloroalkylalkoxysilane under formation of the alkali chloride or trialkylammonium chloride as a by-product. This reaction can be performed with the chloroalkylalkoxysilane under neat condition or in solvents such as benzene, toluene, xylene, or a similar aromatic solvent, as well as methanol, ethanol, or another alcohol-type solvent. It is preferable to have a reaction temperature within the range of 30 to 180 degrees Celsius, preferably within the range of 100 to 160 degrees Celsius. In order to speed up this replacement reaction, phase transfer catalysts of various kinds can be used. Preferable phase transfer catalysts are the following: tetrabutylammonium bromide (TBAB), trioctylmethylammonium chloride, Aliquat® 336 (Cognis GmbH) or similar quaternary ammonium salts (as e.g. used in U.S. Pat. No. 4,946,977), tributylphosphonium chloride (as e.g. used in U.S. Pat. No. 6,841,694), guanidinium salts (as e.g. used in EP0900801) or cyclic unsaturated amines as 1,8-diazabicyclo[5.4.0]undec-7-ene (DBU, as e.g. used in WO2005/103061). If necessary, the following polymerization inhibitors can be used throughout preparation and/or purification steps: hydroquinones, phenol compounds such as methoxyphenol and 2,6-di-t-butyl 4-methylphenol, phenothiazine, p-nitrosophenol, amine-type compounds such as e.g. N,N'-diphenyl-p-phenylenediamine or sulfur containing compounds as described in but not limited to the patents cited above.

Blends of hydrolysable unsaturated silanes can be used. For example, an unsaturated silane of the formula CH2═CH—C6H4-A-SiRaR'(3-a) (I) or CH═C—C6H4-A-SiRaR'(3-a) (II) and an unsaturated silane of the formula R"—CH═CH-A-SiRaR'(3-a) (III), R"—C≡C-A-SiRaR'(3-a) (IV) or R"—C(═CH2)-A-SiRaR'(3-a) (V) can be used together. Alternatively the polymer can be reacted with a mixture of an unsaturated silane containing an aromatic ring conjugated with the olefinic —C═C— or acetylenic —C≡C— unsaturation of the silane, and another unsaturated silane, which contains an olefinic —C═C— bond or acetylenic —C≡C— bond and has at least one hydrolysable group bonded to Si, but does not contain an aromatic ring, for example vinyltrimethoxysilane.

The unsaturated silane should be present in an amount sufficient to graft silane groups to the polyolefin. In some embodiments, other silane compounds are added for example for adhesion promotion but it is preferred that the major part of silane compounds present during the process is the unsaturated silane (I) or (II) so as to obtain efficient grafting. Preferably, unsaturated silane (I) or (II) forms at least 50% by weight, preferably at least 60% by weight of the silane compounds present in the process.

The compound capable of generating free radical sites in the polymer is preferably an organic peroxide, although other free radical initiators such as azo compounds can be used. Preferably the radical formed by the decomposition of the free-radical iniator is an oxygen-based free radical. It is more preferable to use hydroperoxides, carboxylic peroxyesters, peroxyketals, dialkyl peroxides and diacyl peroxides, ketone peroxides, diaryl peroxides, aryl-alky peroxides, peroxydicarbonates, peroxy acids, acylalkyl sulfinyl peroxide and alkyl monoperoxy dicarbonates. Examples of preferred peroxides include dicumyl peroxide, 2,5-dimethyl-2,5-di-(tert-butylperoxy)hexane, di-tert-butyl peroxide, 2,5-dimethyl-2,5-di-(tert-butylperoxy)hexyne-3,3,6,9-triethyl-3,6,9-trimethyl-1,4,7-triperoxonane, benzoyl peroxide, 2,4-dichlorobenzoyl peroxide, tert-butyl peroxyacetate, tert-butyl peroxybenzoate, tert-amylperoxy-2-ethylhexyl carbonate, tert-butylperoxy-3,5,5-trimethylhexanoate, 2,2-di(tert-butylperoxy)butane, tert-butylperoxy isopropyl carbonate, tert-buylperoxy-2-ethylhexyl carbonate, butyl 4,4-di(tert-buylperoxy)valerate, di-tert-amyl peroxide, tert-butyl peroxy pivalate, tert-butyl-peroxy-2-ethyl hexanoate, di(tertbutylperoxy)cyclohexane, tertbutylperoxy-3,5,5-trimethylhexanoate, di(tertbutylperoxyisopropyl)benzene, cumene hydroperoxide, tert-butyl peroctoate, methyl ethyl ketone peroxide, tert-butyl α-cumyl peroxide, 2,5-dimethyl-2,5-di(peroxybenzoate)hexyne-3, 1,3- or 1,4-bis(t-butylperoxyisopropyl)benzene, lauroyl peroxide, tert-butyl peracetate, and tert-butyl perbenzoate. Examples of azo compounds are azobisisobutyronitrile and dimethylazodiisobutyrate. The above radical initators can be used alone or in combination of at least two of them.

The temperature at which the polyolefin and the unsaturated silane are reacted in the presence of the compound capable of generating free radical sites in the polyolefin is generally above 120° C., usually above 140° C., and is sufficiently high to melt the polyolefin and to decompose the free radical initiator. For polypropylene, a temperature in the range 170° C. to 220° C. is usually preferred. The peroxide or other compound capable of generating free radical sites in the polyolefin preferably has a decomposition temperature in a range between 120-220° C., most preferably between 160-190° C.

The amount of unsaturated silane present during the grafting reaction is generally at least 0.2% by weight based on the total composition and can be up to 20% or more. By total composition we mean the starting composition containing all ingredients, including polymer, silane, filler, catalyst etc which are brought together to form the reacting mixture. Preferably the unsaturated silane is present at 0.5 to 20.0% by weight based on the total composition. Most preferably, the unsaturated silane is present at 0.5 to 15.0% by weight based on the total composition.

The compound capable of generating free radical sites in the polyolefin is generally present in an amount of at least 0.001% by weight based on the total composition and can be present in an amount of up to 5 or 10%. An organic peroxide, for example, is preferably present at 0.01 to 2% by weight based on the total composition. Most preferably, the organic peroxide is present at 0.01% to 0.5% by weight based on the total composition.

The unsaturated silane according to the invention permits to avoid the presence of a co-agent. In preferred embodiments, the composition is free of co-agent. In other embodiments however, a co-agent which inhibits polymer degradation by beta scission is present, usually in small amounts. Many polymers of alpha-olefins having 3 or more carbon atoms, for example polypropylene, undergo polymer degradation by chain β-scission when free radical sites are generated in the polyolefin due to the presence of a tertiary carbon. Whilst for some uses, such as increasing the adhesion performances in coatings, such degradation may not be important, in most cases it will be desired to inhibit or even minimize polymer degradation by chain β-scission, particularly where grafting is the first stage of preparing a filled polyolefin composition or crosslinked polyolefin intended to have improved mechanical properties.

The co-agent which inhibits polymer degradation is preferably a compound containing an aromatic ring conjugated with an olefinic —C=C— or acetylenic —C≡C— unsaturated bond. By an aromatic ring we mean any cyclic moiety which is unsaturated and which shows some aromatic character or π-bonding. The aromatic ring can be a carbocyclic ring such as a benzene or cyclopentadiene ring or a heterocyclic ring such as a furan, thiophene, pyrrole or pyridine ring, and can be a single ring or a fused ring system such as a naphthalene, quinoline or indole moiety. Most preferably the co-agent is a vinyl or acetylenic aromatic compound such as styrene, alpha-methylstyrene, beta-methyl styrene, vinyltoluene, vinyl-pyridine, 2,4-biphenyl-4-methyl-1-pentene, phenylacetylene, 2,4-di(3-isopropylphenyl)-4-methyl-1-pentene, 2,4-di(4-isopropylphenyl)-4-methyl-1-pentene, 2,4-di(3-methylphenyl)-4-methyl-1-pentene, 2,4-di(4-methylphenyl)-4-methyl-1-pentene, and may contain more than one vinyl group, for example divinylbenzene, o-, m- or p-diisopropenylbenzene, 1,2,4- or 1,3,5-triisopropylbenzene, 5-isopropyl-m-diisopropenylbenzene, 2-isopropyl-p-diisopropenylbenzene, and may contain more than one aromatic ring, for example trans- and cis-stilbene, 1,1-diphenylethylene, or 1,2-diphenylacetylene, diphenyl imidazole, diphenylfulvene, 1,4-diphenyl-1,3-butadiene, 1,6-diphenyl-1,3,5-hexatriene, dicinnamalacetone, phenylindenone. The co-agent can alternatively be a furan derivative such as 2-vinylfuran. A preferred co-agent is styrene.

The co-agent which inhibits polymer degradation can alternatively be a compound containing an olefinic —C=C— or acetylenic —C≡C— conjugated with an olefinic —C=C— or acetylenic —C≡C— unsaturated bond. For example a sorbate ester, or a 2,4-pentadienoates, or a cyclic derivative thereof. A preferred co agent is ethyl sorbate of the formula:

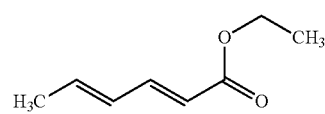

The co-agent which inhibits polymer degradation can alternatively be multi-functional acrylate, such as e.g., trimethylolpropane triacrylate, pentaerythritol tetracrylate, pentaerythriol triacrylate, diethyleneglycol diacrylate, dipropylenglycol diacrylate or ethylene glycol dimethacrylate, or lauryl and stearylacrylates.

The means for generating free radical sites in the polyolefin can alternatively be an electron beam. If electron beam is used, there is no need for a compound such as a peroxide capable of generating free radicals. The polyolefin is irradiated with an electron beam having an energy of at least 5 MeV in the presence of the unsaturated silane. Preferably, the accelerating potential or energy of the electron beam is between 5 MeV and 100 MeV, more preferably from 10 to 25 MeV. The power of the electron beam generator is preferably from 50 to 500 kW, more preferably from 120 to 250 kW. The radiation dose to which the polypropylene/grafting agent mixture is subjected is preferably from 0.5 to 10 Mrad. A mixture of polyolefin and the unsaturated silane can be deposited onto a continuously moving conveyor such as an endless belt, which passes under an electron beam generator which irradiates the mixture. The conveyor speed is adjusted in order to achieve the desired irradiation dose.

The grafting reaction between the polyolefin and the unsaturated silane can be carried out as a batch process or as a continuous process using any suitable apparatus. The polyolefin can for example be added in pellet or powder form or a mixture thereof. The polyolefin is preferably subjected to mechanical working while it is heated. A batch process can for example be carried out in an internal mixer such as a Brabender Plastograph (Trade Mark) 350S mixer equipped with roller blades, or a Banbury mixer. A roll mill can be used for either batch or continuous processing. In a batch process, the polyolefin, the unsaturated silane and the compound capable of generating free radical sites in the polyolefin are generally mixed together at a temperature above the melting point of the polyolefin for at least 1 minute and can be mixed for up to 30 minutes, although the time of mixing at high temperature is generally 3 to 15 minutes. The unsaturated silane and the peroxide can be added sequentially although it is preferred to add the peroxide together with the silane. The high temperature mixing is carried out at a temperature which is between the melt temperature and the degradation temperature of the polyolefin used, which is generally above 120° C. For polypropylene the mixing temperature is preferably above 170° C. The reaction mixture can be held at a temperature above 140° C. for a further period of for example 1 to 20 minutes after mixing to allow the grafting reaction to continue.

Continuous processing is generally preferred, and the preferred vessel is an extruder adapted to mechanically work, that is to knead or compound, the materials passing through it, for example a twin screw extruder. One example of a suitable extruder is that sold under the trade mark ZSK from Coperion Werner Pfleiderer GmbH & Co KG.

The extruder preferably includes a vacuum port shortly before the extrusion die to remove any unreacted silane. The residence time of the polyolefin, the unsaturated silane and the compound capable of generating free radical sites in the polyolefin together at above 120° C. in the extruder or other continuous reactor is generally at least 0.5 minutes and preferably at least 1 minute and can be up to 15 minutes. More preferably the residence time is 1 to 5 minutes. All or part of the polyolefin may be premixed with the unsaturated silane and/or the compound capable of generating free radical sites in the polyolefin before being fed to the extruder, but such premixing is generally at below 120° C., for example at ambient temperature.

The hydrolysable groups, for example silyl-alkoxy groups, present in the silane moieties grafted to the polyolefin react in the presence of moisture with hydroxyl groups present on the surface of many fillers and substrates, for example of minerals and natural products. The moisture can be ambient moisture or a hydrated salt can be added. Grafting of the polyolefin with an unsaturated silane according to the invention can be used to improve compatibility of the polyolefin with fillers. The polyolefin grafted with hydrolysable groups can be used as a coupling agent improving filler/polymer adhesion; for example polypropylene grafted according to the invention can be used as a coupling agent for unmodified polypropylene in filled compositions. The polyolefin grafted with hydrolysable groups can be used as an adhesion promoter or adhesion interlayer improving the adhesion of a low polarity polymer such as polypropylene to surfaces. The hydrolysable groups can also react with each other in the presence of moisture to form Si—O—Si linkages between polymer chains. The polyolefin grafted with hydrolysable groups can be foamed by reaction with moisture in the presence of a blowing agent.

The hydrolysable groups, for example silyl-alkoxy groups, react with each other in the presence of moisture to form Si—O—Si linkages between polymer chains even at ambient temperature without catalyst, but react much more rapidly in the presence of a siloxane condensation catalyst. Thus the grafted polyolefin can be crosslinked by exposure to moisture in the presence of a silanol condensation catalyst. The grafted polyolefin can be foamed by adding a blowing agent, moisture and condensation catalyst. Any suitable condensation catalyst may be utilised. These include protic acids, Lewis acids, organic and inorganic bases, transition metal compounds, metal salts and organometallic complexes.

Preferred catalysts include organic tin compounds, particularly organotin salts and especially diorganotin dicarboxylate compounds such as dibutyltin dilaurate, dioctyltin dilaurate, dimethyltin dibutyrate, dibutyltin dimethoxide, dibutyltin diacetate, dimethyltin bisneodecanoate, dibutyltin dibenzoate, dimethyltin dineodeconoate or dibutyltin dioctoate. Alternative organic tin catalysts include triethyltin tartrate, stannous octoate, tin oleate, tin naphthate, butyltintri-2-ethylhexoate, tin butyrate, carbomethoxyphenyl tin trisuberate and isobutyltin triceroate. Organic compounds, particularly carboxylates, of other metals such as lead, antimony, iron, cadmium, barium, manganese, zinc, chromium, cobalt, nickel, aluminium, gallium or germanium can alternatively be used.

The condensation catalyst can alternatively be a compound of a transition metal selected from titanium, zirconium and hafnium, for example titanium alkoxides, otherwise known as titanate esters of the general formula $Ti[OR5]4$ and/or zirconate esters $Zr[OR5]4$ where each R5 may be the same or different and represents a monovalent, primary, secondary or tertiary aliphatic hydrocarbon group which may be linear or branched containing from 1 to 10 carbon atoms. Preferred examples of R5 include isopropyl, tertiary butyl and a branched secondary alkyl group such as 2,4-dimethyl-3-pentyl. Alternatively, the titanate may be chelated with any suitable chelating agent such as acetylacetone or methyl or ethyl acetoacetate, for example diisopropyl bis(acetylacetonyl)titanate or diisopropyl bis(ethylacetoacetyl)titanate.

The condensation catalyst can alternatively be a protonic acid catalyst or a Lewis acid catalyst. Examples of suitable protonic acid catalysts include carboxylic acids such as acetic acid and sulphonic acids, particularly aryl sulphonic acids such as dodecylbenzenesulphonic acid. A "Lewis acid" is any substance that will take up an electron pair to form a covalent bond, for example, boron trifluoride, boron trifluoride monoethylamine complex, boron trifluoride methanol complex, $FeCl3$, $AlCl3$, $ZnCl2$, $ZnBr2$ or catalysts of formula MR4 fXg where M is B, Al, Ga, In or Tl, each R4 is independently the same or different and represents a monovalent aromatic hydrocarbon radical having from 6 to 14 carbon atoms, such monovalent aromatic hydrocarbon radicals preferably having at least one electron-withdrawing element or group such as —CF3, —NO2 or —CN, or substituted with at least two halogen atoms; X is a halogen atom; f is 1, 2, or 3; and g is 0, 1 or 2; with the proviso that f+g=3. One example of such a catalyst is B(C6F5)3.

An example of a base catalyst is an amine or a quaternary ammonium compound such as tetramethylammonium hydroxide, or an aminosilane. Amine catalysts such as laurylamine can be used alone or can be used in conjunction with another catalyst such as a tin carboxylate or organotin carboxylate.

The silane condensation catalyst is typically used at 0.005 to 1.0% by weight based on the total composition. For example a diorganotin dicarboxylate is preferably used at 0.01 to 0.1% by weight based on the total composition.

The grafted polyolefin can contain one or more organic or inorganic fillers and/or fibers. According to one aspect of the invention grafting of the polyolefin can be used to improve compatibility of the polyolefin with fillers and fibrous reinforcements. Improved compatibility of a polyolefin such as polypropylene with fillers or fibers can give filled polymer compositions having improved properties whether or not the grafted polyolefin is subsequently crosslinked using a silanol condensation catalyst. Such improved properties can for example be improved physical properties derived from reinforcing fillers or fibres, or other properties derived from the filler such as improved coloration by pigments. The fillers and/or fibres can conveniently be mixed into the polyolefin with the unsaturated silane and the organic peroxide during the grafting reaction, or can be mixed with the grafted polyolefin subsequently.

In one embodiment, treating the filler and grafting to the polyolefin are done in situ, in one step. The ingredients (filler, silane, peroxide when used) can be added altogether or separately in the reaction vessel.

In an alternative process, the filler can be first treated with the unsaturated silane and then added to a polyolefin matrix. The silane at the surface of the filler will then react with the polyolefin matrix when free radical sites are generated in the polyolefin.

Some free radical sites are generated when the polyolefin is subjected to high shear at high temperature, for example when the polyolefin is processed in a twin screw extruder, and this may be sufficient to enhance the bonding between the filler and the polyolefin. Free radical sites can also be generated by electron beam. Free radical sites can also be generated by adding a peroxide, optionally with a co-agent which inhibits polymer degradation by beta scission, and processing at elevated temperature.

When forming a filled polymer composition, the grafted polyolefin can be the only polymer in the composition or can be used as a coupling agent in a filled polymer composition also comprising a low polarity polymer such as an unmodified polyolefin. The grafted polyolefin can thus be from 1 or 10% by weight up to 100% of the polymer content of the filled composition. Moisture, and optionally silanol condensation catalyst, can be added to the composition to promote bonding between filler and silane grafted polymer. Preferably the grafted polymer can be from 2% by weight up to 10% of the filled polymer composition.

In an alternative process, the filler can be first treated with the unsaturated silane, for example an unsaturated silane having any of the formulae (I) to (V), and then added to a polyolefin matrix. The silane at the surface of the filler will then react with the polyolefin matrix when free radical sites are generated in the polyolefin. Some free radical sites are generated when the polyolefin is subjected to high shear at high temperature, for example when the polyolefin is processed in a twin screw extruder, and this may be sufficient to enhance the bonding between the filler and the polyolefin. Free radical sites can also be generated by adding a peroxide, optionally with a co-agent which inhibits polymer degradation by beta scission, and processing at elevated temperature.

Examples of mineral fillers or pigments which can be incorporated in the grafted polyolefin include titanium dioxide, aluminium trihydroxide, magnesium dihydroxide, mica, kaolin, calcium carbonate, non-hydrated, partially hydrated, or hydrated fluorides, chlorides, bromides, iodides, chromates, carbonates, hydroxides, phosphates, hydrogen phosphates, nitrates, oxides, and sulphates of sodium, potassium, magnesium, calcium, and barium; zinc oxide, aluminium oxide, antimony pentoxide, antimony trioxide, beryllium oxide, chromium oxide, iron oxide, lithopone, boric acid or a borate salt such as zinc borate, barium metaborate or aluminium borate, mixed metal oxides such as aluminosilicate, vermiculite, silica including fumed silica, fused silica, precipitated silica, quartz, sand, and silica gel; rice hull ash, ceramic and glass beads, zeolites, metals such as aluminium flakes or powder, bronze powder, copper, gold, molybdenum, nickel, silver powder or flakes, stainless steel powder, tungsten, hydrous calcium silicate, barium titanate, silica-carbon black composite, functionalized carbon nanotubes, cement, fly ash, slate flour, bentonite, clay, talc, anthracite, apatite, attapulgite, boron nitride, cristobalite, diatomaceous earth, dolomite, ferrite, feldspar, graphite, calcined kaolin, molybdenum disulfide, perlite, pumice, pyrophyllite, sepiolite, zinc stannate, zinc sulfide or wollastonite. Examples of fibres include natural fibres such as wood flour, wood fibers, cotton fibres, cellulosic fibres or agricultural fibres such as wheat straw, hemp, flax, kenaf, kapok, jute, ramie, sisal, henequen, corn fibre or coir, or nut shells or rice hulls, or synthetic fibres such as polyester fibres, aramid fibers, nylon fibers, or glass fibers. Examples of organic fillers include lignin, starch or cellulose and cellulose-containing products, or plastic microspheres of polytetrafluoroethylene or polyethylene. The filler can be a solid organic pigment such as those incorporating azo, indigoid, triphenylmethane, anthraquinone, hydroquinone or xanthine dyes.

The concentration of filler or pigment in such filled compositions can vary widely; for example the filler or pigment can form from 1 or 2% up to 50 or 70% by weight based on the total composition.

The grafted polyolefin of the invention can also be used to improve the compatibility of a low polarity polymer such as polypropylene with a polar polymer. The composition comprising the low polarity polymer, polar polymer and grafted polyolefin can be filled and/or fibre-reinforced or unfilled.

The grafted polyolefin of the present invention can also be used for increasing the surface energy of polyolefins for further improving the coupling or adhesion of polyolefins based materials with higher surface energy polymers typically used in inks, paints, adhesives, and coatings, e.g., epoxy, polyurethanes, acrylics and silicones.

When forming a crosslinked polymer article, the grafted polyolefin is preferably shaped into an article and subsequently crosslinked by moisture. In one preferred procedure, the silanol condensation catalyst can be dissolved in the water used to crosslink the grafted polyolefin. For example an article thermoformed from grafted polyolefin by moulding or extrusion can be cured under water containing a carboxylic acid catalyst such as acetic acid, or containing a diorganotin carboxylate.

Alternatively or additionally, the silanol condensation catalyst can be incorporated into the grafted polymer before the grafted polyolefin is shaped into an article. The shaped article can subsequently be crosslinked by moisture. The catalyst can be mixed with the polyolefin before, during or after the grafting reaction.

In one preferred procedure, the polyolefin, the unsaturated silane and the compound capable of generating free radical sites in the polyolefin are mixed together at above 120° C. in a twin screw extruder to graft the silane to the polyolefin, and the resulting grafted polyolefin is mixed with the silanol condensation catalyst in a subsequent mixing step. Mixing with the catalyst can for example be carried out continuously in an extruder, which can be an extruder adapted to knead or compound the materials passing through it such as a twin screw extruder as described above or can be a more simple extruder such as a single screw extruder. Since the grafted polyolefin is heated in such a second extruder to a temperature above the melting point of the polyolefin, the grafting reaction may continue in the second extruder.

In an alternative preferred procedure, the silanol condensation catalyst can be premixed with part of the polyolefin, and the unsaturated silane can be premixed with a different portion of the polyolefin, and the two premixes can be contacted, optionally with further polymer, in the mixer or extruder used to carry out the grafting reaction. Since most unsaturated silanes and the preferred condensation catalysts such as diorganotin dicarboxylates are liquids, it may be preferred to absorb each of them separately on a microporous polyolefin such as microporous polyethylene or polypropylene before mixing with the bulk of the polypropylene or other polyolefin in an extruder.

Fillers and/or reinforcing fibres can be incorporated into the polymer composition with the silanol condensation catalyst if this is added to the grafted polyolefin in a separate subsequent step when forming a crosslinked polyolefin.

Whatever the mixing procedure used for adding the catalyst to the grafted polymer, care should be taken when forming a crosslinked polymer article to avoid exposure of the silane and catalyst together to moisture, or of the composition of silane-grafted polymer and catalyst to moisture before its final shape into the desired article.

In other preferred embodiments, crosslinking is made in the absence of silanol condensation catalyst. This is advantageous as it permits to decrease the number of reactants needed, cost and risk of pollution linked to the use of silanol condensation catalyst especially those based on tin. U.S. Pat. No. 7,015,297 provide alkoxysilane-terminated polymer systems which on curing not only crosslink, but also bring about chain extension of the polymers. It is said that by incorporating dialkoxy alpha-silanes, the reactivity of such compositions is also sufficiently high that it is possible to produce compositions without the use of relatively large amounts of catalysts which generally contain tin. US20050119436 reports that EP 372 561 A describes the preparation of a silane-crosslinkable polyether which has to be stored with exclusion of moisture, since it vulcanizes with or without silane condensation catalysts. It was observed that in the process according to the present invention, both γSTM and αSTM silanes are efficient to graft polypropylene resin and quite high degree of crosslinking can be achieved in the material, even without adding DOTDL catalyst into the composition.

On the other hand, when producing a foam article from a grafted polyolefin according to the invention the hydrolysis and condensation reaction preferably takes place directly on mixing with the silanol condensation catalyst. This ensures a higher melt strength of the polymer in the foamed article. The polyolefin grafted with hydrolysable groups is preferably foamed by adding a blowing agent, moisture and condensation catalyst together to the grafted polymer composition. The blowing agent can be a chemical blowing agent generating gas by decomposition, for example azodicarbonamide, or a physical blowing agent which is a vapour or gas injected under pressure which expands when the composition is released to atmospheric pressure.

For many uses the grafted or crosslinked polyolefin preferably contains at least one antioxidant. Examples of suitable antioxidants include tris(2,4-di-tert-butylphenyl)phosphite sold commercially under the trade mark Ciba Irgafos®168, tetrakis[methylene-3-(3,5-di-tert-butyl-4-hydroxyphenyl-propionate)]methane processing stabilizer sold commercially under the trade mark Ciba Irganox®1010 and 1.3.5-trimethyl-2.4.6-tris(3.5-di-tert-butyl-4-hydroxy benzyl) benzene sold commercially under the trade mark Ciba Irganox®1330. It may also be desired that the crosslinked polymer contains a hindered amine light stabiliser such as a 4-substituted-1,2,2,6,6-pentamethylpiperidine, for example those sold under the trade marks Tinuvin 770, Tinuvin 622, Uvasil 299, Chimassorb 944 and Chimassorb 119. The antioxidant and/or hindered amine light stabiliser can conveniently be incorporated in the polymer either with the unsaturated silane and the organic peroxide during the grafting reaction or with the silanol condensation catalyst if this is added to the grafted polymer in a separate subsequent step. The total concentration of antioxidants and light stabilisers in the crosslinked polyolefin is typically in the range 0.02 to 0.20% by weight based on the total composition.

The grafted or crosslinked polyolefin of the invention can also contain other additives such as dyes or processing aids.

The polymer compositions of the invention, particularly filled grafted polyolefin compositions and/or crosslinked polyolefins, can be used in a wide variety of products. The grafted polymer can be blow moulded or rotomoulded to form bottles, cans or other liquid containers, liquid feeding parts, air ducting parts, tanks, including fuel tanks, corrugated bellows, covers, cases, tubes, pipes, pipe connectors or transport trunks. The grafted polymer can be extruded to form pipes, corrugated pipes, sheets, fibers, plates, coatings, film, including shrink wrap film, profiles, flooring, tubes, conduits or sleeves, or extruded onto wire or cable as an electrical insulation layer. The grafted polymer can be injection moulded to form tube and pipe connectors, packaging, gaskets and panels. The grafted polymer can also be foamed or thermoformed. In each case the shaped article can be crosslinked by exposure to moisture in the presence of a silanol condensation catalyst.

Crosslinked polyolefin articles produced according to the invention have improved mechanical strength, melt strength, heat resistance, chemical and oil resistance, creep resistance and/or environmental stress cracking resistance compared to articles formed from the same polyolefin without grafting or crosslinking.

The invention is illustrated by the following Examples.

Raw Materials

The polymers used were:
PP=Isotactic polypropylene homopolymer supplied as Borealis® HB 205 TF (melt flow index MFR 1 g/10 min at 230° C./2.16 kg measured according to ISO 1133);

PPH=Polypropylene homopolymer sold by Total Petrochemicals® as PPH 7060 (MFR 12 g/10 min, 230° C./2.16 kg);

Porous PP was microporous polypropylene supplied by Membrana as Accurel® XP100. This microporous polypropylene was used for absorbing liquid ingredients. Characteristics of Accurel®XP100 are MFR (2.16 kg/230° C.) 2.1 g/10 min (method ISO1133), and melting temperature (DSC) 156° C.

The peroxide used is:
DHBP was 2,5-dimethyl-2,5-di-(tert-butylperoxy)hexaneperoxide supplied as Arkema Luperox® 101 peroxide;

The series of tested silanes are:
Vinyltrimethoxysilane (VTM) was Dow Corning® Z6300;
Styryl-silane was styrylethyltrimethoxysilane supplied by ABCR GmbH & Co. KG at 92% purity;
Silyl-Styrene was 4-(Trimethoxysilyl)styrene can be prepared as described in EP-A-1318153;
γ-methacryloxypropyltrimethoxysilane (γ-MTM) was Dow Corning® Z6030;
γ-sorbyloxypropyltrimethoxysilane (γ-STM) or 2,4-hexadienoïc acid trimethoxysilyl-☐-propyl ester was prepared via nucleophilic substitution reaction of the corresponding carboxylate salt and chloropropyltrimethoxysilane as described in U.S. Pat. No. 4,946,977.
Furanacryloxysilane, or 3-(2'-furan)acrylic acid trimethoxysilyl-☐-propyl ester was prepared similarly according to the procedure described in U.S. Pat. No. 4,946,977;
Siloxybutadiene, or 1-(Trimethylsiloxy)-1,3-butadiene was supplied by ABCR® (ref. AB111504);
α-sorbyloxymethyltrimethoxysilane (α-STM) was prepared via nucleophilic substitution reaction of the corresponding carboxylate salt and chloromethyltrimethoxysilane according to the process described in U.S. Pat. No. 4,946,977.

Other raw materials used were:
Wood flours=F530/200 cellulosic additive sold by S.P.P.S.® in a powder form obtained from pine tries with particle sizes in the range 200-500 microns.
MAg-PP=Orevac® CA100 Maleic anhydride grafted PP (MFR 150-200 g/10 min, 230° C./2.16 kg) sold by Arkema®.
Naphthenic processing oil was Nyflex® 222B sold by Nynas with a viscosity of 104 cSt (40° C., method ASTM D445) and specific gravity 0.892 g/cm3 (method ASTM D4052).
Styrene was ≧99% pure supplied by Sigma-Aldrich Reagent Plus® (ref. S4972).

Condensation catalyst used were:
1% acetic acid diluted into water for curing molded or injected specimens underwater;
Dioctyltindilaurate (DOTDL) supplied by ABCR® (ref. AB106609) diluted into Naphthenic processing oil Nyflex® 222B sold by Nynas with a viscosity of 104 cSt (40° C., method ASTM D445) and specific gravity 0.892 g/cm3 (method ASTM D4052) for compounding into the composite material Anti-oxidants used were:
Irgafos 168 was tris-(2,4-di-tert-butylphenyl)phosphite antioxidant supplied by Ciba as Irgafos®168
Irganox 1010 was tetrakis[methylene-3-(3,5-di-tert-butyl-4-hydroxyphenyl-propionate)]methane phenolic antioxidant supplied by Ciba as Irganox®1010.

EXAMPLE 1

10 parts by weight porous PP pellets were tumbled with 10.5 parts by weight styrylethyltrimethoxysilane and 0.2 parts DHBP until the liquid reagents were absorbed by the polypropylene to form a silane masterbatch.

100 parts by weight Borealis® HB 205 TF polypropylene pellets were loaded in a Brabender® Plastograph 350E mixer equipped with roller blades, in which compounding was carried out. Filling ratio was set to 0.7. Rotation speed was 50 rpm, and the temperature of the chamber was maintained at 190° C. Torque and temperature of the melt were monitored for controlling the reactive processing of the ingredients. The PP was loaded in three portions allowing 1 minute fusion/mixing after each addition. The silane masterbatch was then added and mixed for 4 minutes to start the grafting reaction. 0.5 parts Irganox 1010 and 0.5 parts Irgafos 168 antioxidants were then added and mixed for a further 1 minute during which grafting continued. The melt was then dropped from the mixer and cooled down to ambient temperature. The resulting grafted polypropylene was molded into 2 mm thick sheet on an Agila® PE30 press at 210° C. for 5 minutes before cooling down to ambient temperature at 15° C./min with further pressing.

Samples of the 2 mm sheet were cured at 90° C. for 24 hours in a water bath containing 1% acetic acid as a catalyst.

EXAMPLES 2 AND 3 AND COMPARATIVE EXAMPLES C1 TO C5

Example 1 was repeated replacing the Styryl-silane by an equimolar amount of either 4-(trimethoxysilyl)styrene or γ-STM as shown in Table 1.

For each Example, the torque during compounding and the elastic shear modulus G' of the crosslinked polypropylene after 24 hours curing were measured. These are recorded in Table 1.

The processing torque is the measure of the torque in Newton*meter (N·m) applied by the motor of the Plastograph 350E mixer to maintain the mixing speed of 50 rpm. The value reported is the one of the torque level plateau at the end of the mixing.

The lower the torque, the lower the polymer viscosity. The torque level at the end of mixing stage is therefore an image of polymer degradation during mixing.

Elastic shear modulus (G') measurements were carried out on the Advanced Polymer Analyzer APA2000®. 3.5 g specimens were analyzed above their melting point, at temperature of 180° C. Elastic shear modulus (G') was recorded upon strain sweep under constant oscillating conditions (0.5 Hz). Recording the elastic shear modulus (G'), viscous modulus (G''), and TanD on a range of strain from 1 to 610% takes approximately 8 minutes. From the various plots of G' as a function of percentage strain, the values at 12% strain were all in the linear viscoelastic region. The G'@12% strain value was therefore selected in order to follow the increase in elastic shear modulus as a function of time curing of the specimens described in the Examples.

The gel content of the polypropylene sheet after 24 hours curing was measured and recorded in Table 1. Gel content was determined using method ISO 10147 "Pipes and fittings made of crosslinked polyethylene (PE-X)— Estimation of the degree of crosslinking by determination of the gel content". The principle of the test consists in measuring the mass of a test piece taken from a molded part before and after immersion of the test piece in a solvent (8 hours in refluxing xylene). The degree of crosslinking is expressed as the mass percentage of the insoluble material.

In Comparative example C1, Example 1 was repeated with the omission of the styrylethyltrimethoxysilane. In Comparative Example C2, the 2-styrylethyltrimethoxysilane and the peroxide were omitted. In Comparative Examples C3 and C4, the styrylethyltrimethoxysilane was replaced by an equimolar amount of either vinyltrimethoxysilane or γ-methacryloxypropyltrimethoxysilane respectively. In Comparative Example C5, the styrylethyltrimethoxysilane in Example 1 was replaced by an equimolar amount of vinyltrimethoxysilane together with styrene, which is a known co-agent for inhibiting polypropylene degradation by beta-scission.

containing 1% acetic acid, which results from the good grafting efficiency of the silane of our invention to the polypropylene resin.

Comparing Examples 1 to 3 with Comparative Example C5, we also clearly demonstrate the excellent grafting yield and low polymer degradation of Examples 1, 2 and 3 using a single unsaturated silane according to the invention compared to the use of a known unsaturated silane with a known co-agent for inhibiting polymer degradation, as shown by the differences in torque, G' and gel content values in Table 1.

EXAMPLE 4 AND 5

Following the procedure of Example 1, grafted and crosslinked polypropylene samples were made using silanes

TABLE 1

|  | Example 1 | Example 2 | Example 3 | Comparative Example C1 | Comparative Example C2 | Comparative Example C3 | Comparative Example C4 | Comparative Example C5 |
|---|---|---|---|---|---|---|---|---|
| PP | 100 | 100 | 10 | 100 | 100 | 100 | 100 | 100 |
| Porous PP | 10 | 10 | 10 | 10 | 10 | 10 | 10 | 10 |
| DHBP | 0.2 | 0.2 | 0.2 | 0.2 | — | 0.2 | 0.2 | 0.2 |
| Irganox 1010 | 0.5 | 0.5 | 0.5 | 0.5 | 0.5 | 0.5 | 0.5 | 0.5 |
| Irgafos 168 | 0.5 | 0.5 | 0.5 | 0.5 | 0.5 | 0.5 | 0.5 | 0.5 |
| γ-MTM | — | — | — | — | — | — | 10.35 | — |
| VTM | — | — | — | — | — | 6.0 | — | 6.0 |
| Styryl-Silane | 10.5 | — | — | — | — | — | — | — |
| Silyl-Styrene | — | 9.0 | — | — | — | — | — | — |
| Styrene | — | — | — | — | — | — | — | 4.2 |
| γ-STM | — | — | 11.6 | — | — | — | — | — |
| Torque (Nm) | 53 | 58 | 52 | 15 | 77 | 13 | 30 | 45 |
| G'@12% strain (After Curing) (kPa) | 31 | 42 | 39 | 2 | 20 | 6 | 17 | 14 |
| Gel Content (%) | 74 | 60 | 87 | 0 | 0 | 1 | 24 | 1 |

Comparing Examples 1, 2 and 3 with Comparative Examples C1, C3 and C4, we can observe the significant effect of the silanes of our invention for preventing the degradation of the polypropylene in comparison to either the absence of any silane or the use of vinyltrimethoxysilane and γ-methacryloxypropyltrimethoxysilane. Examples 1, 2 and 3 show a higher torque value than C1, C3 and C4, approaching the torque value of PP without peroxide in Comparative Example C2. Examples 1, 2 and 3 also show substantial crosslinking as illustrated by the high G' and gel content values obtained after curing for 24 hours in a water bath listed below in place of the styrylethyltrimethoxysilane and the amounts of reagents shown in Table 2. Silane amount in Example 4 and 5 are equimolar with each other. The products were tested as described in Example 1 and the results are shown in Table 2.

γ-Sorbyloxypropyltrimethoxysilane (γ-STM)=2,4-hexadienoïc acid trimethoxysilyl-γ-propyl ester;

Furanacryloxysilane=3-(2'-furan)acrylic acid trimethoxysilyl-γ-propyl ester.

TABLE 2

|  | Example 4 | Example 5 | Comparative Example C1 | Comparative Example C2 |
|---|---|---|---|---|
| PP | 100 | 100 | 100 | 100 |
| Porous PP | 10 | 10 | 10 | 10 |
| DHBP | 0.2 | 0.2 | 0.2 | — |
| Irganox 1010 | 0.5 | 0.5 | 0.5 | 0.5 |
| Irgafos 168 | 0.5 | 0.5 | 0.5 | 0.5 |
| γ-STM | 4.1 | — | — | — |
| Furanacryloxysilane | — | 4.5 | — | — |
| Torque (Nm) | 46 | 54 | 15 | 77 |
| G'@12% strain (After Curing) (kPa) | 32 | 37 | 2 | 20 |
| Gel Content (%) | 87 | 86 | 0 | 0 |

Comparing Examples 4 and 5 with Comparative Examples C1 we can observe the degradation prevention effect. Examples 4 and 5 showed a higher torque value than C1, approaching the torque value of PP without peroxide in Comparative Example C2. Examples 4 and 5 also showed high degree of crosslinking, as illustrated by the high G' and gel content values, which results from the good grafting efficiency.

EXAMPLES 6 AND 7 AND COMPARATIVE EXAMPLES C6 TO C10

Studies in comparison to U.S. Pat. No. 6,864,323 were carried out. Comparative examples C6 to C10 were prepared from the procedure of Example 1 of U.S. Pat. No. 6,864,323 using a Brabender® Plastograph 350E mixer and amounts of reagents listed in Table 3. The Comparative Examples C6 to C10 described in Table 3 were prepared using vinyltrimethoxysilane in combination with either styrene, or siloxybutadiene or styrylsilane co-agents in respective amounts that are described in U.S. Pat. No. 6,864,323.

The products were tested as described in Example 1 and the results are shown in Table 3.

TABLE 3

|  | Comparative Example C6 | Comparative Example C7 | Comparative Example C8 | Comparative Example C9 | Comparative Example C10 | Example 6 | Example 7 |
|---|---|---|---|---|---|---|---|
| PP | 100 | 100 | 100 | 100 | 100 | 100 | 100 |
| Porous PP | 10 | 10 | 10 | 10 | 10 | 10 | 10 |
| DHBP | 0.2 | 0.2 | 0.2 | 0.2 | 0.2 | 0.2 | 0.2 |
| Irganox 1010 | 0.5 | 0.5 | 0.5 | 0.5 | 0.5 | 0.5 | 0.5 |
| Irgafos 168 | 0.5 | 0.5 | 0.5 | 0.5 | 0.5 | 0.5 | 0.5 |
| γ-ATM | — | — | — | — | — | — | — |
| Styrene | 1.4 | — | — | — | — | — | — |
| VTM | 2.0 | 2.0 | 2.0 | 2.0 | 2.0 | — | — |
| γ-STM | — | — | — | — | — | — | 3.8 |
| Styryl-silane | — | — | — | 0.07 | 0.24 | 3.4 | — |
| Siloxybutadiene | — | 0.07 | 0.24 | — | — | — | — |
| Torque (Nm) | 41 | 14 | 19 | 16 | 20 | 40 | 44 |
| G' @ 12% strain After Cure [kPa] | 13 | 2 | 3 | 2 | 4 | 34 | 31 |
| % gel content | 0 | 0 | 0 | 0 | 0 | 82 | 87 |

The torque results in Table 3 showed that formulations of comparative examples did not allow proper prevention of the polypropylene degradation except for Comparative example C6 where styrene contributes to prevent this degradation. On the contrary, torque values of Examples 6 and 7 using adequate concentration of the respective silanes used confirmed that styrylsilane and siloxybutadiene can both contribute to prevent polypropylene resin degradation.

From the G' and gel content values in Table 3 we can conclude that the silane modified polypropylene resin of Examples 6 and 7 have cured to a high crosslink density, since G' and gel content are much higher than that of the reference PP in Comparative Example C2 in Table 1. On the other hand Comparative examples C6 to C10 show quite low G' and gel content values reflecting almost complete absence of crosslinking since VTM silane was effectively not grafting to polypropylene in the conditions described in U.S. Pat. No. 6,864,323.

Those latter results confirmed that the process described in U.S. Pat. No. 6,864,323 is not appropriate to preventing polypropylene resin degradation by β-scission and does not provide any valuable mean to modify polypropylene resin to the contrary of our present invention.

EXAMPLES 8 AND 9 AND COMPARATIVE EXAMPLES C11 AND C12

Following the procedure of Example 1, grafted and crosslinked polypropylene samples were made using 40% by weight wood flours and the amounts of reagents in weight percents shown in Table 4.

In Example 8, 5% by weight of a pre-grafted polypropylene compound was prepared according to a continuous process using a Brabender® DSE 20/40 co-rotating twin screw extruder having screw diameter of 20 mm and L/D=40. Screws rotation speed was 250 rpm and temperature profile of the 6 heating zones was the following:

T1=190° C.;
T2=200° C.;
T3=210° C.;
T4=210° C.;
T5=210° C.;
T6=210° C.

The compound obtained, γ-STM grafted PP, was added as coupling agent between wood flours and polypropylene according to recipe shown in Table 4.

In Example 9, the coupling reaction between wood flours and polypropylene did occur in-situ during the compounding of wood flours into polypropylene.

The products were tested as described in Example 1 for torque and elastic shear modulus (G') and the results are shown in Table 4.

The resulting compounds were shaped into 4 mm thick plates by compression moulding on Agila® PE30 press at 210° C. for 5 minutes before cooling down to ambient temperature at 15° C./min with further pressing. Tensile specimens according to ISO-527 type 1B were cut out of the moulded sheets with a Ray-Ran® Polytest CNC cutting mill. The 4 mm thick multipurpose samples were not cured before testing. Mechanical performances of each compound were evaluated by tensile testing of these specimens according to ISO-527. Results obtained are shown in Table 4.

TABLE 4

|  | Example 8 | Example 9 | Comparative Example C11 | Comparative Example C12 |
| --- | --- | --- | --- | --- |
| PP | 49.3 | 52.1 | 49.3 | 54.3 |
| Porous PP | 5 | 5 | 5 | 5 |
| Wood Flours | 40 | 40 | 40 | 40 |
| DHBP | — | 0.05 | — | — |
| Irganox 1010 | 0.35 | 0.35 | 0.35 | 0.35 |
| Irgafos 168 | 0.35 | 0.35 | 0.35 | 0.35 |
| γ-STM | — | 1.8 | — | — |
| γ-STM grafted PP | 5 | — | — | — |
| Maleic Anhydride grafted PP (MAg-PP) | — | — | 5 | — |
| Torque (Nm) | 60 | 59 | 56 | 47 |
| G' @ 12% strain After Cure [kPa] | 61 | 81 | 50 | 44 |
| Tensile strength max. (MPa) | 30 | 36 | 31 | 18 |
| Tensile modulus (MPa) | 3039 | 3290 | 2989 | 2529 |
| Tensile strain max. (%) | 1.5 | 1.7 | 1.6 | 1.2 |
| Water uptake (%) - day 1 | 1.6 | 1.3 | 4.8 | 2.2 |
| Water uptake (%) - day 3 | 2.2 | 1.9 | 5.8 | 3.3 |
| Water uptake (%) - day 15 | 4.2 | 3.3 | 8.4 | 6.3 |
| Water uptake (%) - day 31 | 6.1 | 4.8 | 10.3 | 9.0 |

From the G' values in Table 4 we can conclude that the composites of Examples 8 and 9 have cured to higher degree of crosslink density, since G' values are superior to that of the reference coupling agent technology, MAg-PP in Comparative Example C11.

From tensile strength, strain and modulus values in Table 4 we can conclude that the composites of Examples 8 and 9 have similar to better mechanical properties than that of the reference coupling agent technology, MAg-PP in Comparative Example C11 and much better than that of the composite without any coupling agent as in Comparative Example C12.

Water uptake tests were carried out upon immersion of specimens in demineralized water at room temperature. The percentage of water uptake was computed as the ratio of the difference between the sample weight after a given period of immersion underwater and the initial weight before immersion underwater to initial weight, expressed in percent.

From water uptake values in Table 4 we can conclude that the composites of Examples 8 and 9 have much better resistance to water uptake than that of the reference coupling agent technology, MAg-PP in Comparative Example C11 and that of the composite without any coupling agent as in Comparative Example C12.

EXAMPLES 10, AND COMPARATIVE EXAMPLES C13 AND C14

Grafted and crosslinked polypropylene samples were made according to a continuous extrusion process using 30% by weight wood flours and the amounts of reagents shown in Table 5. Polypropylene used was PPH (MFI 12) described in the raw material section above in place of PP (MFI 1) used in previous examples. Coupling between wood flours and polypropylene was carried out in-situ similarly to the procedure used for Example 9. The continuous process was carried out on a Brabender® DSE 20/40 co-rotating twin screw extruder having screw diameter of 20 mm and L/D=40.

The resulting compounds were then shaped into 4 mm thick multipurpose specimens conforming to ISO-3167 by injection moulding according to ISO-294. Mechanical performances of each compound were evaluated by tensile testing of these uncured specimens according to ISO-527. Impact strengths were also measured on these uncured specimens according to Charpy method ISO179-2 on un-notched specimens. Results obtained are shown in Table 5.

TABLE 5

|  | Example 10 | Comparative Example C13 | Comparative Example C14 |
| --- | --- | --- | --- |
| PPH | 53.8 | 51.0 | 55.1 |
| Porous PP | 5 | 5 | 5 |
| Wood Flours | 30 | 30 | 30 |
| DHBP | 0.05 | — | — |
| Irganox 1010 | 0.3 | 0.3 | 0.3 |
| Irgafos 168 | 0.3 | 0.3 | 0.3 |
| γ-STM | 1.8 | — | — |
| Maleic Anhydride grafted PP (MAg-PP) | — | 5 | — |
| G' @ 12% strain After Cure [kPa] | 18 | 13 | 13 |
| Tensile strength max. (MPa) | 44.9 | 41 | 31 |
| Tensile modulus (MPa) | 2860 | 2863 | 2695 |
| Tensile strain max. (%) | 4.2 | 3.4 | 3.6 |
| Impact (Charpy, un-notched, kJ/m$^2$) | 17 +/− 3 | 19 +/− 2 | 16 +/− 2 |
| Water uptake (%) - day 1 | 0.2 | 0.3 | 0.3 |
| Water uptake (%) - day 5 | 0.5 | 0.6 | 0.6 |
| Water uptake (%) - day 8 | 0.7 | 0.7 | 0.9 |
| Water uptake (%) - day 15 | 0.8 | 0.8 | 1.0 |
| Water uptake (%) - day 25 | 0.9 | 1.0 | 1.3 |
| Water uptake (%) - day 32 | 1.1 | 1.2 | 1.4 |

From tensile strength, modulus and strain values in Table 5 we concluded that the composites of Examples 10 had quite similar mechanical properties than that of MAg-PP coupling agent tested as a reference, in Comparative Example C13 and better than that of the composite without any coupling agent as in Comparative Example C14.

From impact strength values in Table 5 we concluded that the composite of Examples 10 had similar resistance to impact than that of MAg-PP coupling agent tested as a reference, in Comparative Example C13 and that of the composite without any coupling agent as in Comparative Example C14.

From water uptake values in Table 5 we concluded that the composites of Examples 10 had quite similar resistance to water uptake than that of MAg-PP coupling agent tested as a reference, in Comparative Example C13 and significantly better than that of the composite without any coupling agent as in Comparative Example C14.

EXAMPLES 11 TO 14

Following the procedure of Example 1 and using amounts of reagents shown in Table 6, grafted and crosslinked polypropylene samples were prepared either with or without addition of dioctyltindilaurate (DOTDL) catalyst at the end of the mixing step in the roller blades mixer.

To the contrary of prior Example 1, the curing was carried out underwater at 95° C. in absence of any additional crosslinking catalyst diluted in the water bath. Therefore, the effect of DOTDL catalyst addition in the material itself was evaluated.

TABLE 6

|  | Example 11 | Example 12 | Example 13 | Example 14 |
| --- | --- | --- | --- | --- |
| PP - MFI 1 | 100 | 100 | 100 | 100 |
| Porous PP | 10 | 10 | 10 | 10 |
| DHBP | 0.2 | 0.2 | 0.2 | 0.2 |
| Irganox 1010 | 0.5 | 0.5 | 0.5 | 0.5 |
| Irgafos 168 | 0.5 | 0.5 | 0.5 | 0.5 |
| γ-STM | 4.1 | 4.1 | — | — |
| α-STM | — | — | 2.5 | 2.5 |
| DOTDL | — | 0.04 | — | 0.04 |
| Parrafinic oil | 2.4 | 2.4 | 2.4 | 2.4 |
| Torque (Nm) | 40 | 42 | 37 | 37 |
| G' @ 12% strain Before Cure [kPa] | 9 | 12 | 8 | 11 |
| G' @ 12% strain After Cure [kPa] | 21 | 23 | 20 | 25 |
| Gel content (%) | 70 | 75 | 90 | 87 |

Torque values of Examples 11 to 14 indicated in Table 6 are almost all the same and consistent with prior Examples, which confirmed the good efficiency of grafting of both γSTM and αSTM silanes to polypropylene resin. Torque values of Examples 11 and 12 are inferior to torque values obtained in Example 3 (Table 1), which is consistent with the difference in γSTM silane concentrations used in these respective examples.

The analysis of elastic shear modulus (G') and gel content values of Examples 11 to 14 shown in Table 6 indicates that quite high degree of crosslinking can be achieved in the material, independently from the addition or not of DOTDL catalyst into the composition. Results in Table 6 also confirmed that to the contrary to VTM used in Comparative Examples C3 and C5 (Table 1) both γSTM and αSTM silanes of our invention can effectively graft onto polypropylene resin while preventing β-scission to occur during compounding in presence of radical initiator.

It is not straightforward to compare Examples 11 and 12 against Examples 13 and 14. Indeed the amounts of mole of γSTM used in Examples 11 and 12 are not corresponding to the amounts of mole of αSTM silane that were used in Examples 13 and 14. Nevertheless, despite the fact that in Examples 13 and 14 about two thirds of the molar amounts only of silane were used compared to Examples 11 and 12, the degree of crosslinking achieved were quite similar, even higher. This latter observation confirms that αSTM grafted polypropylene does not require the use of a condensation catalyst (e.g., DOTDL) to achieve complete crosslinking in the material.

The difference in G' and gel content values of Example 11 and 12 against Example 3 (Table 1) is also in perfect agreement with the difference in γSTM concentrations used in these respective examples.

The invention claimed is:

1. A process for grafting hydrolysable silane groups to a polyolefin, the process comprising reacting the polyolefin with a sorbyloxyalkylsilane having at least one hydrolysable group bonded to Si, in the presence of means capable of generating free radical sites in the polyolefin.

2. A process according to claim 1 characterised in that the polyolefin comprises at least 50% by weight units of an alpha-olefin having 3 to 8 carbon atoms.

3. A process according to claim 2 characterised in that the polyolefin is polypropylene.

4. A process according to claim 1 characterised in that the hydrolysable group of the silane has the formula —SiR$_a$R'$_{(3-a)}$ wherein R represents a hydrolysable group; R' represents a hydrocarbyl group having 1 to 6 carbon atoms; and a has a value in the range 1 to 3 inclusive.

5. A process according to claim 1 characterised in that the sorbyloxyalkylsilane is partially hydrolyzed and condensed into oligomers.

6. A process according to claim 1 wherein the sorbyloxyalkylsilane is γ-sorbyloxypropyltrimethoxysilane.

7. A process according to claim 1 characterised in that the sorbyloxyalkylsilane is present at 0.5 to 20.0% by weight based on the total composition.

8. A process according to claim 1 characterised in that an organic peroxide compound capable of generating free radical sites in the polymer is present in the composition in an amount of 0.01 to 2% by weight based on the total composition.

9. A process for grafting hydrolysable silane groups to a polyolefin, the process comprising treating the polyolefin with an electron beam in the presence of sorbyloxyalkylsilane having at least one hydrolysable group bonded to Si.

10. A process according to claim 1 characterised in that the sorbyloxyalkylsilane is deposited on a filler before being reacted with the polymer.

11. A process according to claim 1 characterised in that the polymer, sorbyloxyalkylsilane and filler are reacted in situ.

12. A process for carrying out the crosslinking of a polymer, characterized in that the grafted polyolefin prepared by the process according to claim 1 is exposed to moisture optionally in the presence or absence of a silanol condensation catalyst.

13. A process according to claim 12 characterized in that the grafted polyolefin is shaped into an article and subsequently crosslinked by exposure to moisture.

14. A process for forming a foamed polymer, characterized by adding a blowing agent, moisture and condensation catalyst together to the grafted polyolefin prepared by the process according to claim 1.

* * * * *